(12) United States Patent
Vickery et al.

(10) Patent No.: US 6,655,124 B2
(45) Date of Patent: Dec. 2, 2003

(54) EXTERNAL SYSTEM AND METHOD FOR ROCKET EXHAUST PLUME SIGNATURE TAILORING

(75) Inventors: Charles A. Vickery, Corona Del Mar, CA (US); William D. Kruse, Redondo Beach, CA (US); Mark Olmos, Upland, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 66 days.

(21) Appl. No.: 10/085,681

(22) Filed: Feb. 26, 2002

(65) Prior Publication Data

US 2003/0159427 A1 Aug. 28, 2003

(51) Int. Cl.⁷ .................................................. F02K 9/97
(52) U.S. Cl. ............................... 60/205; 60/770; 60/264
(58) Field of Search .......................... 60/205, 257, 770, 60/264

(56) References Cited

U.S. PATENT DOCUMENTS

| | | | |
|---|---|---|---|
| 3,012,400 A | * 12/1961 | Corson | 60/264 |
| 3,112,612 A | * 12/1963 | Adamson | 60/228 |
| 3,279,193 A | * 10/1966 | Webb | 60/266 |
| 3,733,828 A | 5/1973 | Brown | |
| 3,774,871 A | 11/1973 | Semmes et al. | |
| 4,209,351 A | 6/1980 | Pierce et al. | |
| 4,644,745 A | 2/1987 | Wagner | |
| 5,251,436 A | 10/1993 | Brogan | |
| 5,440,993 A | 8/1995 | Osofsky | |
| 5,746,047 A | 5/1998 | Steyer et al. | |
| 6,054,521 A | 4/2000 | Nelson et al. | |
| 6,125,763 A | 10/2000 | Kline et al. | |
| 6,308,514 B2 | 10/2001 | Häaggander et al. | |

* cited by examiner

Primary Examiner—Ehud Gartenberg
(74) Attorney, Agent, or Firm—Tarolli, Sundheim, Covell & Tummino L.L.P.

(57) ABSTRACT

Systems and methods are disclosed for tailoring rocket exhaust plume signatures of fuel-propelled vehicles. An uncombusted fuel is injected or sprayed into the exhaust plume of an ignited rocket. The injected or sprayed fuel modifies the rocket exhaust plume to simulate an exhaust plume of a different vehicle. One or more parameters associated with the injected or sprayed fuel can be modified, so that appropriate tailoring can be achieved.

25 Claims, 9 Drawing Sheets

```
                    ┌──────────────────────────┐
                    │  SELECT PLUME PROFILE    │─── 300
                    └──────────────┬───────────┘
                                   ▼
                    ┌──────────────────────────┐
                    │ ADJUST CONCENTRATION     │─── 310
                    │ LEVELS OF FUEL MIXTURE   │
                    └──────────────┬───────────┘
                                   ▼
                    ┌──────────────────────────┐
                    │ INITIALIZE TIMER AND     │─── 320
                    │ IGNITE ROCKET MOTOR      │
                    └──────────────┬───────────┘
                                   ▼
                    ┌──────────────────────────┐
                    │ BEGIN FUEL MIXTURE SPRAY │─── 330
                    │ AT FIRST CONCENTRATION   │
                    │ LEVEL                    │
                    └──────────────┬───────────┘
                                   ▼
                         ◇ TIME LIMIT? ◇ ─── 340
                         NO → loop back
                         YES ↓
                    ┌──────────────────────────┐
                    │ ADJUST FUEL MIXTURE TO A │─── 350
                    │ SECOND CONCENTRATION     │
                    │ LEVEL                    │
                    └──────────────┬───────────┘
                                   ▼
                         ◇ TIME LIMIT? ◇ ─── 360
                         NO → loop back
                         YES ↓
                    ┌──────────────────────────┐
                    │ ADJUST FUEL MIXTURE TO A │─── 370
                    │ THIRD CONCENTRATION      │
                    │ LEVEL                    │
                    └──────────────────────────┘
```

FIG. 9

```
SELECT PLUME PROFILE                                    — 400
           │
           ▼
SET FUEL SPRAY AT AN INITIAL
SETTING BASED ON SELECTED                               — 410
PLUME PROFILE
           │
           ▼
IGNITE ROCKET MOTOR                                     — 420
           │
           ▼
BEGIN FUEL SPRAY AT THE INITIAL                         — 430
SETTING
           │
           ▼
MEASURE AT LEAST ONE                                    — 440
PARAMETER
           │
           ▼
      ADJUSTMENT ?                                      — 450
       NO / YES
           │
           ▼ YES
ADJUST PLUME SIGNATURE BASED                            — 460
ON MEASUREMENT
```

FIG. 10

EXTERNAL SYSTEM AND METHOD FOR ROCKET EXHAUST PLUME SIGNATURE TAILORING

FIELD OF THE INVENTION

The present invention relates to fuel-propelled vehicles and, more particularly, to systems and methods for tailoring rocket exhaust plume signatures of fuel-propelled vehicles.

BACKGROUND OF THE INVENTION

Fuel-propelled vehicles, such as rockets and missiles, utilize rocket motors to propel the vehicle through air and space. The rocket motors generally fall into three types, which are solid propellant motors, liquid propellant motors and hybrid propellant motors. Solid propellant motors utilize a solid fuel element or grain that is placed in a large solid combustion chamber. The solid fuel element or grain is usually bonded to the combustion chamber walls and burns away during flight. The liquid propellant motors employ liquid fuel tanks coupled to a fixed combustion chamber through one or more fuel lines. A hybrid propellant motor generally uses a fluid reactant (e.g., an oxidizer) to burn a solid fuel element or a fluid fuel element with a solid reactant, which are ignited in a combustion chamber.

Typically, the combustion chamber is connected to a nozzle assembly regardless of the type of rocket motor being employed. The nozzle can be a supersonic nozzle with a subsonic portion and a supersonic portion. The subsonic portion is connected to the combustion chamber, while the supersonic portion opens to the outside environment. The propellant is ignited in the combustion chamber producing heated gases moving at subsonic speeds. The gas is then accelerated to supersonic speed by the subsonic portion of the nozzle which decreases in diameter as the gas passes through the nozzle. The gas then reaches supersonic speed and enters the supersonic portion of the nozzle which increases in diameter as the gas passes through the nozzle and exits into the environment.

Chemical vehicle propulsion systems maximize performance by converting the chemical energy of a propellant into thermodynamic energy in the form of high temperature and high-pressure gases. For example, expanding the high temperature gases through a supersonic nozzle to atmospheric conditions generates a maximum thrust per pound of the propellants being utilized to drive the vehicle. Conventional rockets and missiles minimize the amount of mass expended external to the nozzle throat, since this is typically an inefficient use of the total vehicle mass. Therefore, when designing a rocket or missile vehicle, the propellants are usually selected to maximize the high-energy release per pound. These types of propellants usually contain toxic materials (e.g., acidic compounds, oxides of toxic minerals) that are detrimental to the environment.

Target vehicles are utilized in testing rocket and missile defense systems. These target vehicles simulate an enemy vehicle so that the rocket and missile defense system can be tested prior to implementation into the field. The rocket and missile defense systems employ optics and/or infrared technology to track and destroy the target vehicle. The target vehicles operate in a similar manner to the enemy vehicles but do not carry any explosives. Additionally, due to environmental concerns, the propellants utilized in the target vehicles are nontoxic propellants. Typically, the target vehicle signature plume is substantially weaker than the signature plume for the actual vehicle that the target vehicle is simulating. However, military standards contain requirements that demand certain standards be met when testing the optics and/or infrared components of the missile defense system. Therefore, it is desirable to provide the target vehicle with a plume signature substantially similar to the plume signature of the actual enemy vehicle, while still employing nontoxic propellants.

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for tailoring rocket exhaust plume signatures of fuel-propelled vehicles. The tailoring of the rocket exhaust plume signature is accomplished by injecting or spraying uncombusted fluid fuel (e.g., liquid fuel, gas fuel) directly into the exhaust plume of an ignited rocket. The injected or sprayed fuel controls or modifies the exhaust plume of the rocket, which can be defined by a plume profile. The plume profile can be selected off-line prior to implementation into vehicle or selected on-line though use of a programmed controller device. The plume profile defines one or more parameters associated with the injected or sprayed fuel, so that appropriate tailoring can be achieved. The one or more parameters can be, for example, fluid flow rate, concentration levels of the fluid and one or more additives, or measured parameters for real-time adjustments associated with the injected or spayed fuel.

In one aspect of the invention, the fuel-propelled vehicle is a self-propelled vehicle such as a liquid fuel propellant or a solid fuel propellant missile or rocket. The missile or rocket can be a target vehicle used in testing of missile defense systems. The rocket exhaust plume of the target vehicle can be modified or tailored to simulate an actual missile or rocket without using toxic materials to propel the target vehicle. If the target vehicle is a liquid fuel-propelled vehicle, the same liquid fuel supply propelling the vehicle can be employed to tailor or modify the rocket exhaust plume. The flow rate of the fuel into the rocket exhaust plume can be modified during a flight pattern due to changes in environmental and/or internal rocket conditions to more realistically simulate the actual vehicle.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 9 illustrates a flow diagram of a methodology for controlling a plume signature by adjusting concentration levels of a fuel mixture in accordance with an aspect of the present invention.

FIG. 10 illustrates a flow diagram of a methodology for controlling a plume signature by varying a fuel flow rate based on one or more measured parameters in accordance with an aspect of the present invention.

DETAILED DESCRIPTION OF THE INVENTION

The present invention relates to systems and methods for tailoring rocket exhaust plume signatures of fuel-propelled vehicles. The tailoring of the rocket exhaust plume signature is accomplished by injecting or spraying an uncombusted fuel into the exhaust plume of an ignited rocket. One or more parameters associated with the injected or sprayed fuel can be varied to control or modify (e.g., tailor) the exhaust plume of the rocket, which can be defined as a plume profile. The one or more parameters can be, for example, fluid flow rate, concentration levels of the fluid and one or more additives, or measured parameters for real-time adjustments associated with the injected or spayed fuel.

The present invention can be employed in a target vehicle that simulates an actual rocket or missile. The target vehicle can use non-toxic propellant, which typically reduces the infrared characteristics associated with the exhaust plume of the target vehicle. The present invention can be employed to spray or inject uncombusted fuel directly into the exhaust plume, thus modifying (e.g., enhancing, reducing) the exhaust plume. If the target vehicle is a liquid fuel-propelled vehicle, the same liquid fuel supply propelling the vehicle can be employed to modify the exhaust plume. Otherwise, a separate liquid fuel supply can be employed. Although some of the examples set forth in the description employ liquid fuel, other fuels (e.g., gas, solid particulates) can be employed to carry out the present invention.

In the following description, for purposes of explanation, numerous examples are set forth in order to provide a thorough understanding of the present invention. It may be evident, however, that the present invention may be practiced in other examples not set forth in the following description. In other instances, structures and devices are shown in block diagram form in order to facilitate describing various aspects of the present invention.

Figure 1:
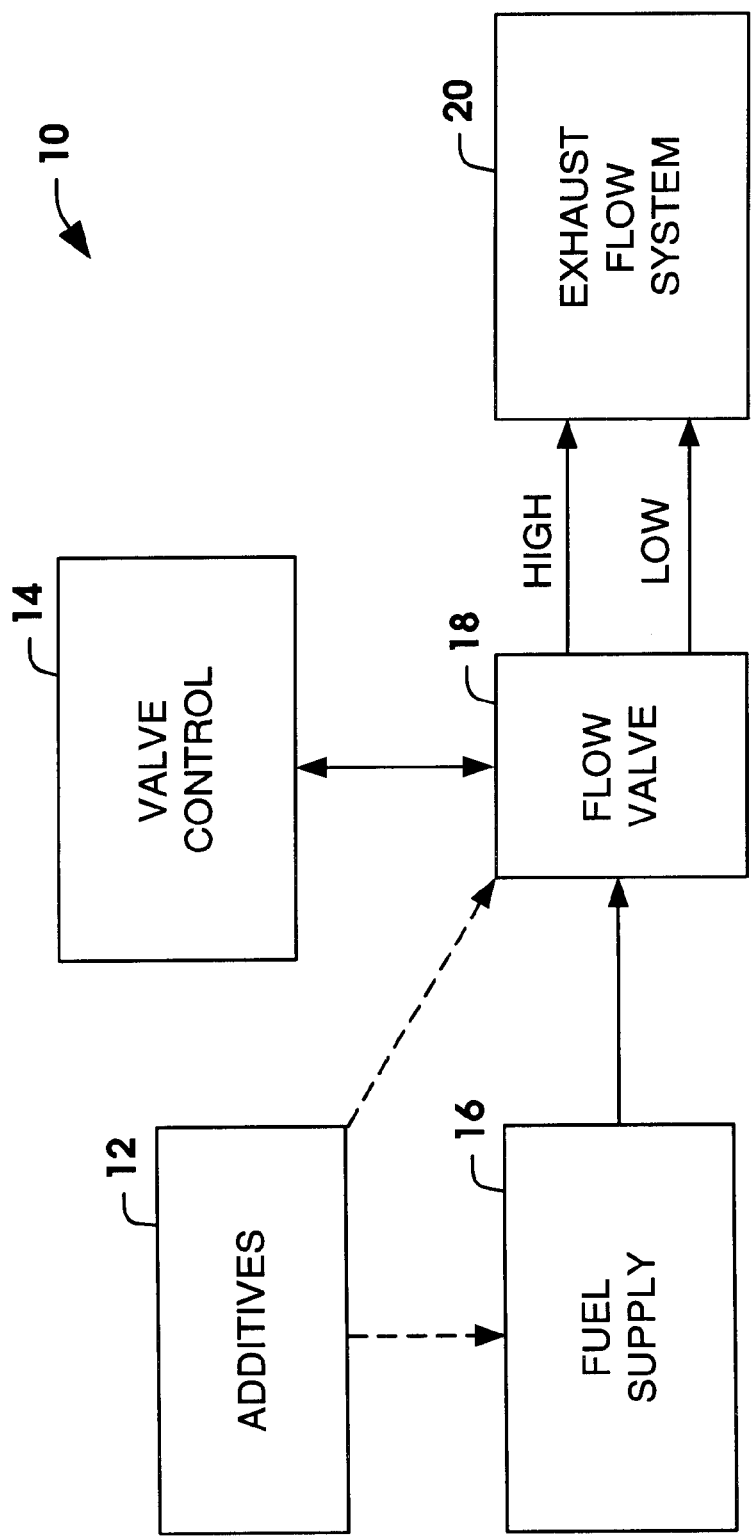
FIG. 1 illustrates a block diagram of a system for tailoring a plume signature in accordance with an aspect of the present invention.

FIG. 1 illustrates a block diagram of a system 10 for tailoring a plume signature in accordance with an aspect of the present invention. The system 10 includes a flow valve 18 coupled to a fuel supply system 16. The fuel supply system 16 can provide fuel 16 to an exhaust flow system 20 through the flow valve 18. The volume of fuel can be controlled to adjust, modify or tailor the infrared signature of an exhaust plume of a fuel-propelled vehicle. The exhaust flow system can be an exhaust flow system of a self-propelled vehicle, such as a rocket or missile. It is to be appreciated that the system 10 can also be employed in manned vehicles to adjust the plume signature of the manned vehicle (e.g., spacecraft, aircraft, rocket powered automobiles). In one aspect of the invention, the fuel is a liquid fuel. The liquid fuel can be any number of uncombusted liquid fuel types, for example, jet fuel, rocket fuel or synthetic fuel.

In one aspect of the invention, one or more fuel additives 12 can be mixed with the fuel supply system 16 or through the flow valve 18. The one or more additives 12 can be selected to simulate different plume signature types or to modify a current signature type. Fuels that contain more energetic bonds provide hotter flow fields. Fuels with relatively high carbon to hydrogen (C/H) ratios tend to produce more soot and, thus enhance the plume signature across a broader infrared band. These types of fuel additives can be added to kerosene based fuels or employed by themselves to modify the exhaust plume signature of the system 10. Relevant general chemical categories that can be used as fuel additives include aromatics (including multi-ringed molecules), strained alkane and alkene molecules, turpentine, and other earth-storable energetic materials.

Additionally, the concentration levels of the fuel and the one more additives can be selected to simulate different plume signature types. Furthermore, the one or more additives 12 and concentration levels can be selected so as to simulate a plume signature over a desired signature pattern. For example, certain signatures can have a plume signature that changes over time, and the volume and concentration of the fuel and additives can be selected to simulate a desired plume signature over the life of the plume signature. The one or more additives 12 can be mixed with the fuel prior to incorporation into the system 10. Alternatively, the one or more fuel additives 12 can be added to the fuel at a controlled rate as the fuel is being provided to the flow valve 18, or the one or more additives 12 and the fuel can be provided to the flow valve 18 concurrently at a controlled rate.

It is to be appreciated that if the system 10 is a liquid fuel driven vehicle (e.g., liquid propellant motor driven vehicle, hybrid propellant motor driven vehicle), the same liquid fuel supply source can be utilized to simulate or modify the plume signature in addition to driving or propelling the vehicle. Alternatively, a second liquid fuel supply source can be provided to modify the plume signature to simulate the plume signatures of other vehicles. For example, a separate liquid fuel supply source can be employed in a solid propellant motor driven vehicle.

The system 10 also includes a valve control system 14 coupled to the flow valve. The valve control system 10 controls the state of the flow valve 18. In the example of FIG. 1, the flow valve 18 has a high state for a high flow rate, a low state for a low flow rate and an off state for no fuel flow. The valve control system 10 can be programmed to switch the states of the flow valve 18 to adjust the flow rate of the fuel into the exhaust flow system 20 during the life of the plume signature.

For example, if the system 10 is rocket or missile system that has a predetermined flight pattern, the valve control system 14 can be operative to modify the states of the flow valve at different locations and/or times during the flight pattern, thus modifying the injection flow rate of the non-combusted fuel into the plume during afterburning. Some rocket systems have flight patterns that begin at launch from the ground continue through the air and above the atmosphere. During the atmospheric portion of a rocket or missile flight, injecting noncombusted fuel into the rocket exhaust will react with the exhaust species and the environmental oxygen available to produce the desired effect on the plume intensity. As the rocket or missile reaches higher altitudes, the desired effect of the environmental oxygen on the exhaust plume will be less and less. The desired effect on the plume signature can be determined and controlled by the injection rate of the fuel, the trajectory of the rocket and the atmospheric conditions at the time and location of the flight.

In the example of FIG. 1, the valve control system 14 can be programmed or designed to move the flow valve from an off state to a low state during launching and flying through the atmosphere. Since the oxygen level outside the rocket system effects the plume signature, the valve control system can move the flow valve from the low state to the high state once the rocket system leaves the atmosphere, so that the desired plume signature is maintained. As the rocket system reenters the atmosphere, the valve control system 14 can move the flow valve 18 from the low state to the high state. The valve control system 14 can employ a timer to modify the states of the flow valve by pre-estimating the flight pattern locations at different times during the flight pattern. Alternatively, the valve control system 14 can employ an altimeter or oxygen measurement system to determine when to modify the states of the flow valve.

The valve control system 14 can be provided as a stand-alone device, incorporated into the flow valve 18 or implemented utilizing the guidance system of the vehicle. The functionality associated with the valve control system 14 can be implemented in hardware (e.g., ASIC, Timer) and/or software (e.g., processor, guidance computer). Although the flow valve 14 is illustrated as having three states, the flow valve can be a variable flow valve having an infinite number of states.

Figure 2:
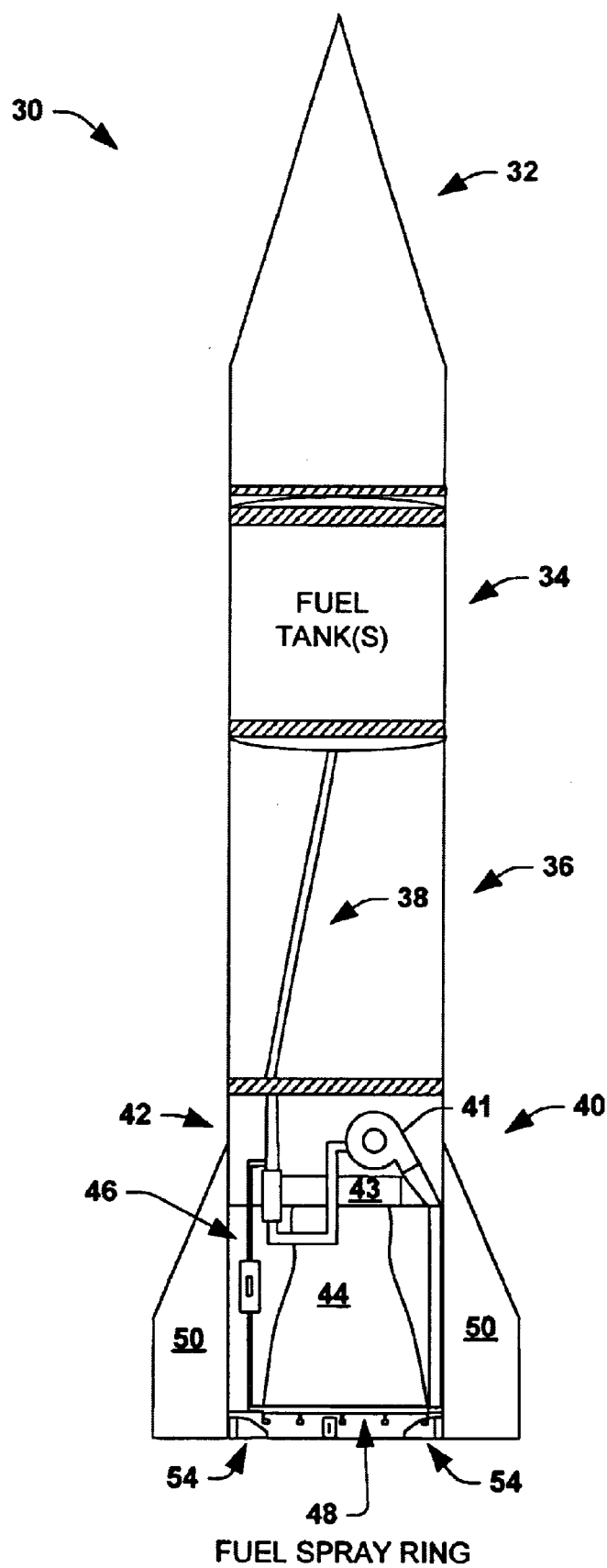
FIG. 2 illustrates a partial cross-sectional view of a rocket system in accordance with an aspect of the present invention.

FIG. 2 illustrates a rocket system 30 that employs a fuel spray system for controlling and/or adjusting a plume signature in accordance with an aspect of the present invention. The rocket system 30 can be employed as a target rocket utilized in testing rocket and missile defense systems. The target rocket can utilize environmentally safe nontoxic propellants, which create an exhaust plume generally weaker than actual rockets. The present invention provides for control, adjustment and tailoring of the exhaust plume so that simulation of an actual rocket or missile exhaust plume can be obtained. Therefore, improved simulation of rockets and missiles can be obtained for meeting the military requirements associated with optics and/or infrared components of missile defense systems, which need to be tested prior to implementation into the field.

The rocket system 30 includes a front end portion 32 and a fuel tank portion 34. The fuel tank portion 34 includes one or more fuel tanks (e.g., liquid fuel tanks). A central portion 36 connects the fuel tank portion 34 to an engine bay 40. A fuel line 38 extends from the fuel tank portion 34 through the central portion 36 to the engine bay 40. The central portion 36 provides separation of the fuel from combustion that occurs in the engine bay 40. The engine bay 40 includes a rocket motor or booster system 42 coupled to a nozzle assembly 44. The rocket motor or booster system 42 having an engine or pump 41 that delivers fuel into a combustion chamber 43. It is to be appreciated that if the rocket system 30 is a solid propellant rocket system, the fuel tank portion 34 and the central portion 36 would be integrated into a single solid propellant chamber connected to the nozzle assembly 44 through the combustion chamber 43.

The nozzle assembly 44 includes a bell shaped nozzle with one end connected to the combustion chamber 43 and the other end providing an exit for the exhaust plume. The rocket system 30 includes fins 50 mounted to the exterior of the engine bay and jet vanes 54 mounted to the interior of the engine bay outside of the m outer portion or an exit of the nozzle assembly 44. The fins 50 and the jet vanes 54 facilitate steering and guidance of the rocket system 30. The fins 50 and jet vanes 54 are controllable by a guidance computer or system (not shown). The nozzle can be a supersonic nozzle with a subsonic portion connected to the combustion chamber 43 and supersonic portion open to the outside environment.

An exhaust plume is formed by gas and heat generated by the combustion in the combustion chamber 43 and exiting the nozzle assembly 44. A spray assembly 46 is coupled to the fuel line 38 for injecting or spaying uncombusted fuel into the plume for adjusting or modifying the plume signature. The spray assembly 46 can include a fuel spray line, a spray valve and a fuel spray ring 48. The fuel spray ring 48 is mounted to a bottom portion of the nozzle assembly 44 for directing a portion of uncombusted fuel directly into the exhaust plume. The volume and/or flow rate of uncombusted fuel provided to the exhaust plume can be controlled by the spray valve. The spray valve can be controlled manually, or automatically by a guidance computer or guidance system (not shown).

Figure 3:
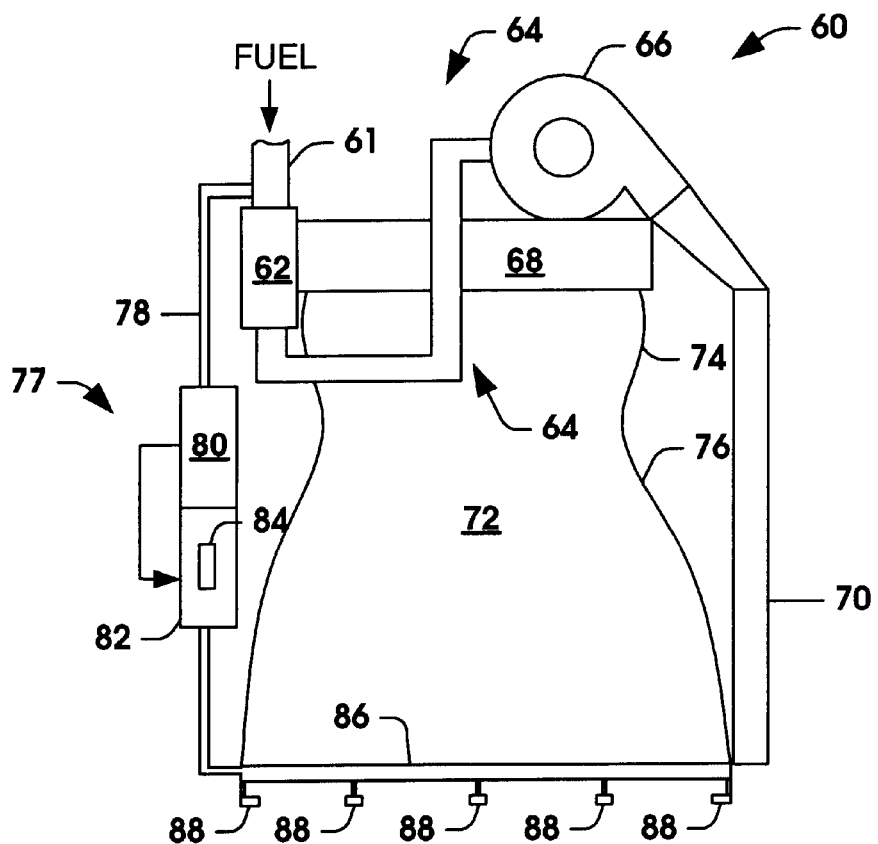
FIG. 3 illustrates a front view of a rocket engine in accordance with an aspect of the present invention.

FIG. 3 illustrates a rocket booster or rocket engine system 60 in accordance with an aspect of the present invention. The rocket engine system 60 includes a fuel injection system 64 comprised of a fuel inlet line 61, an engine fuel valve 62, a turbopump 66 and a turbine exhaust line 70. It is to be appreciated that the fuel injection system 64 can include other parts and components not illustrated in FIG. 3. For example, the fuel injection system 64 can include oxidizer parts and components, cooling parts and components, gas generator start and ignition components and filtering components. Additional components would be apparent to those skilled in the art of rocket engine design.

The fuel injection system 64 provides fuel to a combustion chamber 68. The fuel propellant is ignited in the combustion chamber 68 producing heated gases moving at subsonic speeds. The gases are provided to a nozzle 72 having a generally bell shape. The nozzle 72 includes a subsonic portion 74 and a supersonic portion 76. The heated gases associated with the combustion of the fuel are provided to the subsonic portion 74 of the nozzle 72. The heated gases are then accelerated to supersonic speed by the subsonic portion 74 of the nozzle 72, which decreases in diameter as the gas passes through the nozzle 72. The heated gases then reach supersonic speed and enter the supersonic portion 76 of the nozzle 72, which increases in diameter as the gas passes through the nozzle 72 and exits into the environment.

A fuel spray system 77 is provided for controlling, adjusting and/or tailoring a plume signature associated with the exhaust plume caused by the exiting heated gases. The spray assembly includes a fuel line 78 for injecting or spaying uncombusted fuel into the exhaust plume for adjusting, modifying and/or tailoring the plume signature. The fuel spray system 77 includes a flow valve 82 and an optional control module 80 that controls the flow rate and/or volume of the fuel through the flow valve 82 into the exhaust plume. Alternatively, the flow valve 82 can be controlled manually using a manual knob 84, or automatically by a guidance computer or system (not shown). A fuel spray ring 86 is mounted to a bottom outside circumference of the nozzle 72. The fuel spray ring 86 includes a plurality of nozzles or orifices 88 directed into the plume. The fuel spray system 77 can provide a flow of uncombusted fuel directly into the exhaust plume through the nozzles 88 of the fuel spray ring 86.

Figure 4:
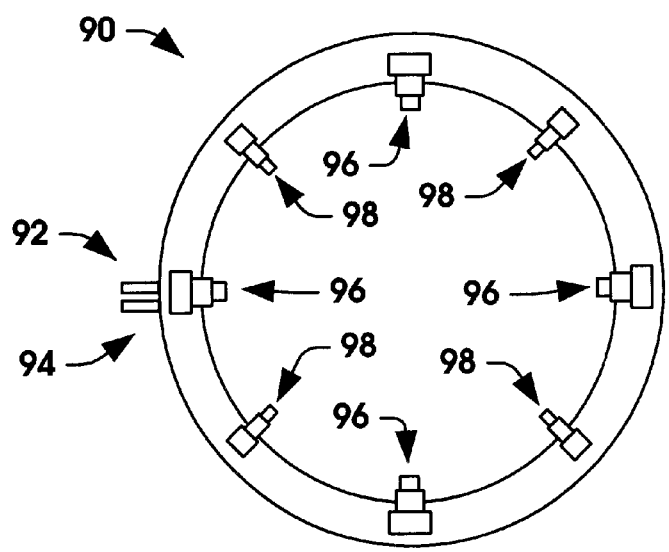
FIG. 4 illustrates a bottom view of a spray ring in accordance with an aspect of the present invention.

It is to be appreciated that the flow rate and/or volume of uncombusted fuel provided to the plume can also be varied by the spray ring or some other spraying device for providing uncombusted fuel into the plume at a controlled volume and rate. FIG. 4 illustrates an alternate configuration of a spray ring 90 having a plurality of nozzle assemblies spaced equidistant around the circumference of the spray ring 90. The plurality of nozzle assemblies include a first set of nozzles 96 for high volume spraying and a second set of nozzles 98 for low volume spraying. The first set of nozzles 96 are connected to a first fuel supply tube 92 and the second set of nozzles 98 are connected to a second fuel supply tube 94. The first fuel supply tube 92 can be connected to a fuel supply line through a first flow valve, while the second fuel supply tube 94 can be connected to the fuel supply line through a second flow valve. A three-way valve can be utilized in place of the first and second valves.

Fuel can be supplied to the first fuel supply tube 92 with the first flow valve turned "ON" and the second flow valve turned "OFF" for high volume spraying. Fuel can be supplied to the second fuel supply tube 94 with the second flow valve turned "ON" and the first flow valve turned "OFF" for low volume spraying. Alternatively, fuel can be supplied to the first fuel supply tube 92 with the first flow valve turned "ON" and the second flow valve turned "OFF" for low volume spraying, and fuel can be supplied to both the first fuel supply tube 92 and the second fuel supply tube 94 with both the first flow valve and the second flow valve turned "ON" for high volume spraying.

Figure 5:
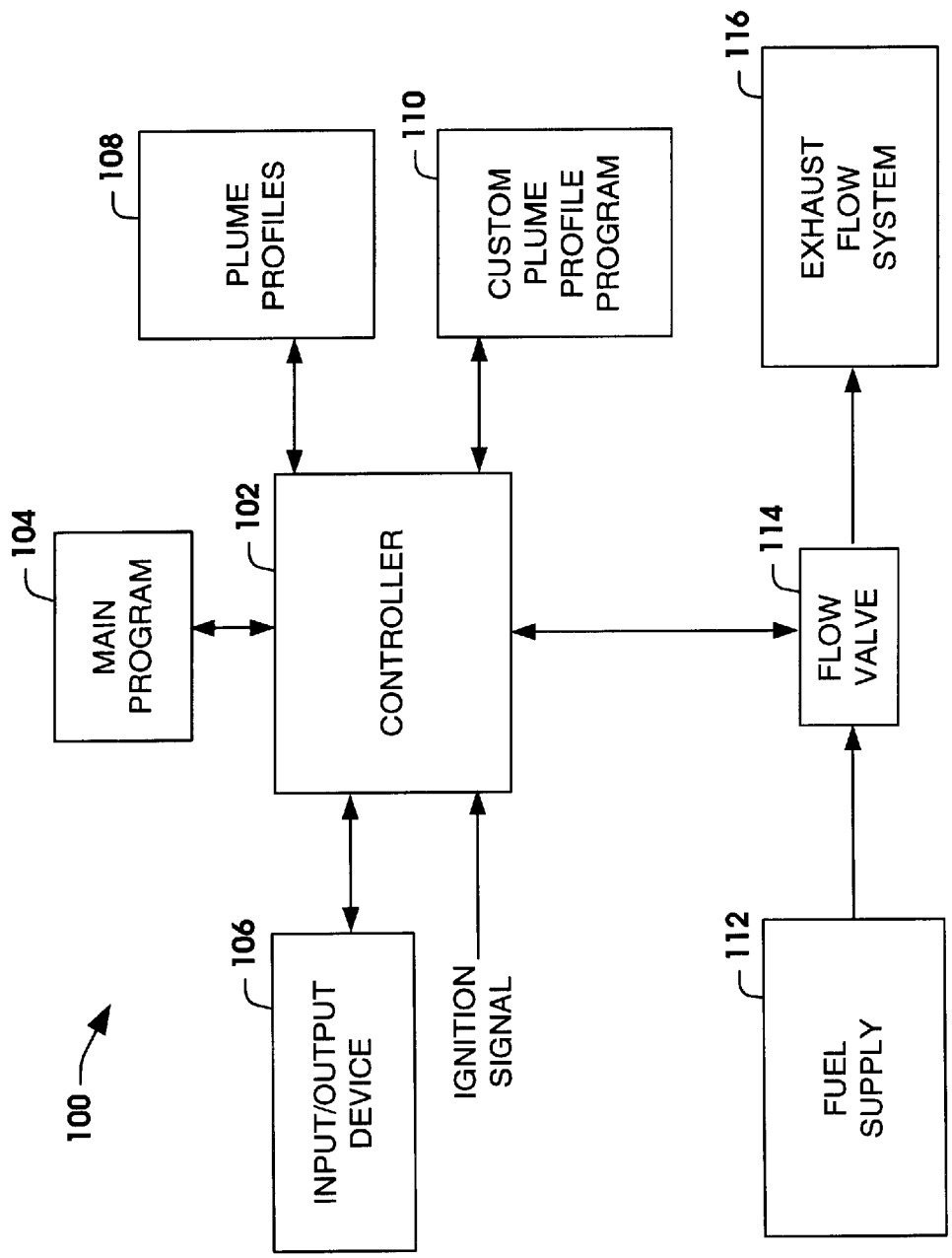
FIG. 5 illustrates a block diagram of a plume signature control system with selectability of different plume signature profiles in accordance with an aspect of the present invention.

FIG. 5 illustrates a plume signature control system 100 that allows for selectability of different plume signature profiles in accordance with an aspect of the present invention. The system 100 provides for selectability of one or more plume signature profiles in addition to providing an operator the ability to create custom plume signature profiles. Therefore, a system user or programmer can programmatically provide simulation of different target vehicles based on the desired testing being performed. The system 100 can be incorporated into any number of target vehicles with similar vehicle types and different vehicle types being programmable to simulate a variety of different actual vehicle types.

The system 100 includes an input/output device 106 coupled to a controller 102. The input/output device 106 can include a keypad or keyboard and a display, such as an LED display or LCD display. The input/output device 106 also includes hardware and/or software for interfacing with the controller 102. The controller 102 can be a processor, a control chip, an ASIC or a combination of hardware and software devices for carrying out the functionality associated with the system 100. The controller 102 executes a main program 104 that provides a selection screen to the input/output device 106. The selection screen allows a user of the system 100 to input one or more parameters about the system 100 and/or the vehicle that the system is being implemented. Additionally, the selection screen allows the user to select between a plurality of preprogrammed plume profiles 108. The main program 104 via the selection screen allows the user to install, save and delete plume profiles for execution.

The main program 104 also allows a user to create one or more custom plume profiles using a custom plume profile program 110. The created custom plume profiles also can be installed, saved (e.g., added to the plume profiles 108) or deleted. The main program 104 then loads the selected plume or custom plume profile for execution and modifies the selected plume profile based on the one or more system parameters inputted by the user. The controller 102 begins execution of the loaded plume profile upon receiving an ignition signal.

The system 100 includes a flow valve 114 coupled to a fuel supply system 112. The fuel supply system 114 can provide fuel to an exhaust flow system 116 through the flow valve 114. The flow valve 114 can have one or more states or be a completely variable flow valve having a plurality of states. The controller 102 controls the flow rate and/or volume of fuel based on the executing loaded plume profile to adjust the infrared signature of the exhaust plume of the vehicle. The exhaust flow system 116 can be an exhaust flow system of a self-propelled vehicle, such as a rocket or missile, or a manned vehicle (e.g., spacecraft, aircraft, rocket powered automobiles). In one aspect of the invention, the fuel supply system 112 provides liquid fuel to the exhaust flow system 116. The liquid fuel can be any number of uncombusted liquid fuel types, for example, jet fuel, rocket fuel or synthetic fuel.

Figure 6:
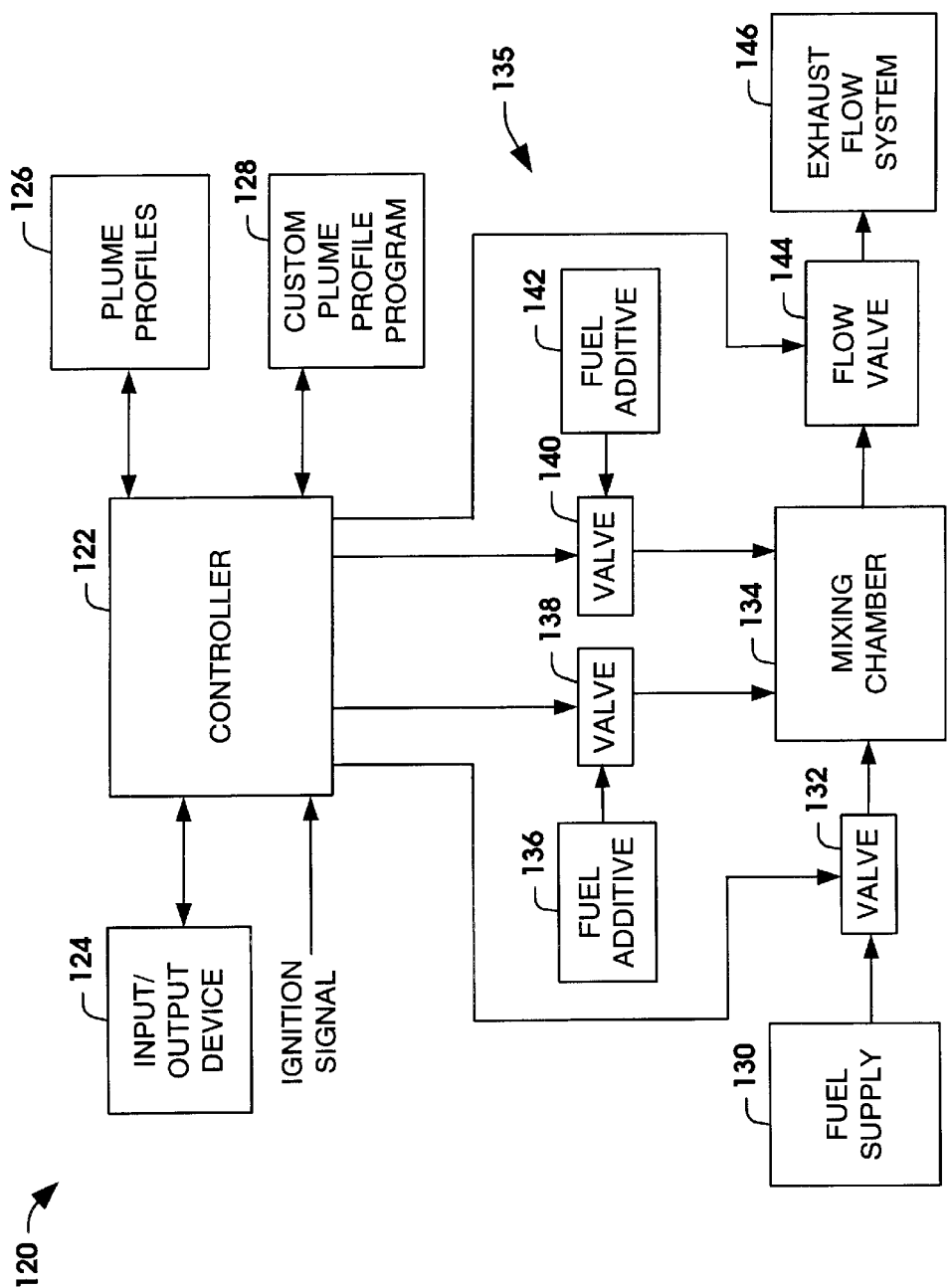
FIG. 6 illustrates a block diagram of a plume signature control system that varies fuel and fuel additive concentration levels in accordance with an aspect of the present invention.

FIG. 6 illustrates a plume signature control system 120 that provides different plume signature profiles using fuel and one or more fuel additives in accordance with an aspect of the present invention. The system 120 can be incorporated into any number of target vehicles with exhaust plumes of similar vehicle types and different vehicle types being programmable to simulate exhaust plumes of a variety of different actual vehicle types.

A controller 122 provides a selection screen to an input/output device 124. A user of the system 120 can input one or more parameters about the system 120 and/or the vehicle that the system 120 is being implemented. Additionally, the user can select between a plurality of preprogrammed plume profiles 126 or create one or more custom plume profiles using a custom plume profile program 128. The controller 122 then loads the selected plume or custom plume profile for execution and modifies the selected plume profile based on the one or more system parameters inputted by the user. The controller 122 begins execution of the loaded plume profile upon receiving an ignition signal.

The system 120 includes a fuel supply system 135 having a fuel supply 130, a first fuel additive 136 and a second fuel additive 142. The fuel supply 130, the first fuel additive 136 and the second fuel additive 142 are connected to a mixing chamber 134 via a first valve 132, a second valve 138 and a third valve 140, respectively. The controller 122 is coupled to the first valve 132, the second valve 138 and the third valve 140, such that the controller 122 can adjust the volume and concentration level of the fuel and the fuel additives provided into the mixing chamber 134. The volume and concentration level of the fuel and the fuel additives can be determined based on the selected plume profile, such that different plume signatures can be provided by adjusting the concentration levels of the mixture of fuel and fuel additives. The first and second fuel additives of FIG. 6 are for illustrative purposes and it is to be appreciated that one or more additives can be employed in accordance with an aspect of the invention.

A flow valve 144 is coupled to the mixing chamber 134. The mixing chamber 134 can provide a fuel mixture (e.g., liquid fuel and one or more additives) to an exhaust flow system 146 through the flow valve 144. The flow valve 144 can have one or more states or be a completely variable flow valve. The controller 122 controls the volume of fuel mixture through the flow valve 144 into the exhaust flow system 146 based on the executing loaded plume profile to adjust the infrared signature of the exhaust plume of the vehicle. The exhaust flow system 146 can be an exhaust flow system of a self-propelled vehicle, such as a rocket or missile, or a manned vehicle (e.g., spacecraft, aircraft, rocket powered automobiles). If the fuel is a liquid fuel, the liquid fuel can be any number of uncombusted liquid fuel types, for example, jet fuel, rocket fuel or synthetic fuel. The fuel additives can be any of aromatics (including multi-ringed molecules), strained alkane and alkene molecules, turpentine, and other earth-storable energetic materials.

Figure 7:
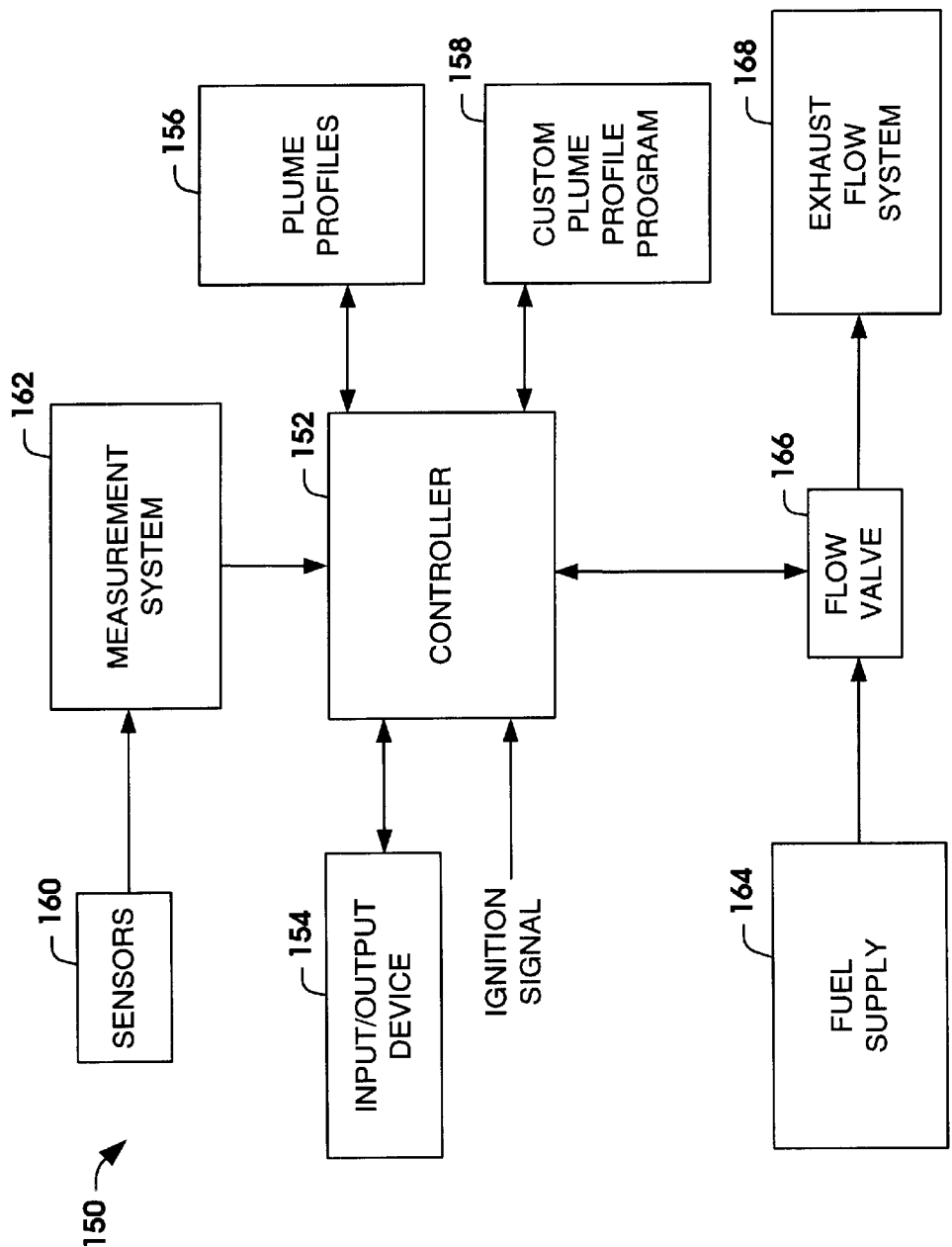
FIG. 7 illustrates a block diagram of a plume signature control system that varies fuel flow rate based on one or more measured parameters in accordance with an aspect of the present invention.

FIG. 7 illustrates a plume signature control system 150 that provides different plume signature profiles in addition to adjusting the plume signatures based on one or more measured parameters in accordance with an aspect of the present invention. The system 150 can be incorporated into any number of target vehicles with exhaust plumes of similar vehicle types and different vehicle types being programmable to simulate exhaust plumes of a variety of different actual vehicle types.

A controller 152 provides a selection screen to an input/output device 154. A user of the system 150 can input one or more parameters about the system 150 and/or the vehicle that the system 150 is being implemented. Additionally, the user can select between a plurality of preprogrammed plume profiles 156 or create one or more custom plume profiles using a custom plume profile program 158. The controller 152 then loads the selected plume or custom plume profile for execution and modifies the selected plume profile based on the one or more system parameters inputted by the user. The controller 152 begins execution of the loaded plume profile upon receiving an ignition signal.

The system 150 includes a flow valve 166 coupled to a fuel supply system 164. The fuel supply system 164 can provide fuel to an exhaust flow system 168 through the flow valve 166. The flow valve 166 can have one or more states or be a completely variable flow valve having a plurality of states. The controller 152 controls the flow rate and/or volume of fuel into the exhaust flow system 168 based on the executing loaded plume profile to adjust the infrared signature of the exhaust plume of the vehicle. The exhaust flow system 168 can be an exhaust flow system of a self-propelled vehicle, such as a rocket or missile, or a manned vehicle (e.g., spacecraft, aircraft, rocket powered automobiles). If the fuel is liquid fuel, the liquid fuel can be any number of uncombusted liquid fuel types, for example, jet fuel, rocket fuel or synthetic fuel.

A measurement system 162 samples one or more parameters using one or more sensors 160. For example, the one or more sensors 160 can measure the environmental oxygen level so that adjustments can be made to the exhaust plume (e.g., fuel flow rate) during operation of the vehicle implementing the system 150. The one or more sensors 160 can measure additional parameters, for example, exhaust temperature, environmental temperature, exhaust pressure, atmospheric pressure, vehicle acceleration, vehicle speed, actual fuel volume and fuel flow rate into the exhaust system. The measurement system 162 provides information or signals to the controller 152, which can make appropriate system adjustments such as modifying the selected plume profile and/or adjusting fuel volume and/or flow rate into the exhaust flow system 168.

It is to be appreciated that some the examples illustrated in FIGS. 1–7 illustrate modification and/or tailoring of the exhaust plume of a rocket motor driven vehicle employing uncombusted liquid fuel. However, the present invention is not limited to uncombusted liquid fuel and other fluids (e.g., combustible gases, combustible liquids) and other fuels (e.g., solid particulates) can be employed in accordance with an aspect of the present invention.

Figure 8:
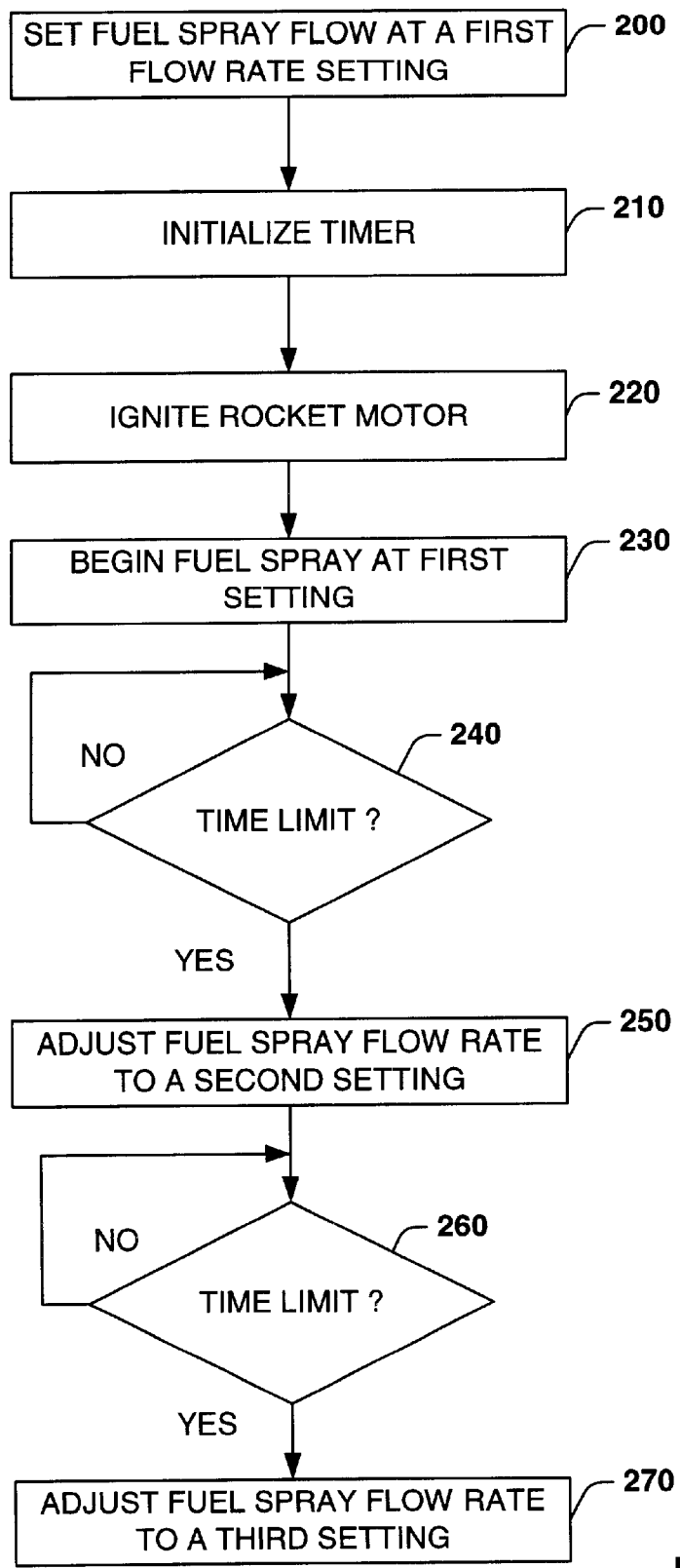
FIG. 8 illustrates a flow diagram of a methodology for controlling a plume signature in accordance with an aspect of the present invention.

In view of the foregoing structural and functional features described above, methodologies in accordance with various aspects of the present invention will be better appreciated with reference to FIGS. 8–10. While, for purposes of simplicity of explanation, the methodologies of FIGS. 8–10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates a methodology for controlling or tailoring a plume signature of a rocket motor by injecting fuel into an exhaust plume of the rocket motor in accordance with an aspect of the present invention. The methodology can be employed in rocket or missile that leaves the atmosphere at some point in its flight pattern. The use of fuel (e.g., liquid fuel) into the exhaust plume has different effects in the presence of high and low oxygen levels. Therefore, different flow rate settings can be employed to assure that the exhaust plume is consistent during flight positions within and outside the atmosphere.

The methodology begins at 200 where a fuel spray flow rate is set to a first flow rate setting. The fuel spray flow rate can be set by a flow valve connected to a fuel supply having two or more flow rate settings. The fuel supply can be mixed with one or more additives that enhance or inhibit the exhaust plume. The methodology then proceeds to 210. At 210, a timer is initialized in preparation for motor ignition. The timer can be a stand-alone timer, reside in a control module or reside in software programmed into a guidance computer. At 220, the rocket motor is ignited causing the timer to begin counting and generating an exhaust plume from the nozzle of the rocket motor. The methodology then advances to 230.

At 230, the fuel spray is injected into the exhaust plume at the first flow rate setting resulting in a modification (e.g., infrared increase, infrared decrease) of the exhaust plume. At 240, the methodology determines if a first predetermined time limit has been achieved employing the timer. If the first predetermined time limit has not been achieved (NO), the methodology continues to repeat 240. If the first predetermined time limit has been achieved (YES), the methodology proceeds to 250. At 250, the fuel spray flow rate is adjusted to a second setting, such that fuel spray is injected into the exhaust plume at the second flow rate setting. For example, the second setting can be for flight location outside the atmosphere. The methodology then advances to 260.

At 260, the methodology determines if a second predetermined time limit has been achieved employing the timer. If the second predetermined time limit has not been achieved (NO), the methodology continues to repeat 260. If the second predetermined time limit has been achieved (YES), the methodology proceeds to 270. At 270, the fuel spray flow rate is adjusted to a third setting, such that fuel spray is injected into the exhaust plume at the third flow rate setting. The third flow rate setting can be the same as the first fuel rate setting. For example, the fuel spray flow rate can be returned to its initial flow rate once the rocket or missile reenters the atmosphere.

FIG. 9 illustrates a methodology for controlling a plume signature of a rocket motor by injecting a fuel mixture with one or more additives into an exhaust plume of the rocket motor in accordance with an aspect of the present invention. The methodology begins at 300 where a plume signature profile is selected by an operator. The plume signature profile can be selected through a graphical user interface of a control module or be decided upon off-line and programmed into a controller device. At 310, the concentration levels of the fuel and one or more additives forming the fuel mixture are set based on a first concentration level. The methodology then proceeds to 320. At 320, a timer is initialized and the rocket motor is ignited generating an exhaust plume from the nozzle of the rocket motor. The methodology then advances to 330. At 330, the fuel mixture spray is injected into the exhaust plume at the first concentration level resulting in a modification of the exhaust plume.

At 340, the methodology determines if a first predetermined time limit has been achieved employing the timer. If the first predetermined time limit has not been achieved (NO), the methodology continues to repeat 340. If the first predetermined time limit has been achieved (YES), the methodology proceeds to 350. At 350, the fuel spray mixture concentration is adjusted to a second concentration level, such that fuel spray is injected into the exhaust plume at the second concentration level. The methodology then advances to 360.

At 360, the methodology determines if a second predetermined time limit has been achieved employing the timer. If the second predetermined time limit has not been achieved (NO), the methodology continues to repeat 360. If the second predetermined time limit has been achieved (YES), the methodology proceeds to 370. At 370, the fuel spray mixture concentration is adjusted to a third concentration level, such that fuel spray is injected into the exhaust plume at the third concentration level. The methodology can continually repeat adjustment of the concentration levels based on the selected plume profile.

FIG. 10 illustrates a methodology for controlling a plume signature of a rocket motor by modifying the flow rate of an injection of fuel into an exhaust plume of the rocket motor based on the measurement of at least one parameter in accordance with an aspect of the present invention. The methodology begins at 400 where a plume signature profile is selected by an operator. The plume signature profile can be selected through a graphical user interface of a control module or be decided upon off-line and programmed into a controller device. The selected plume signature profile determines an initial fuel spray setting (e.g., flow rate, fuel mixture concentration). At 410, the fuel spray is set to an initial setting based on the selected plume profile. The methodology then proceeds to 420. At 420, the rocket motor is ignited generating an exhaust plume from the nozzle of the rocket motor. The methodology then advances to 430. At 430, the fuel spray is injected into the exhaust plume at the initial setting resulting in a modification of the exhaust plume.

At 440, the methodology measures at least one real-time parameter (e.g., oxygen levels, exhaust temperature, environmental temperature, exhaust pressure, atmospheric pressure, vehicle acceleration, vehicle speed, actual fuel volume, fuel flow rate, concentration levels). At 450, the methodology determines if an adjustment is necessary based on the measured parameter. If an adjustment is not necessary (NO), the methodology returns to 440 to repeat measuring of the at least one parameter. If the adjustment is necessary (YES), the methodology advances to 460. At 460, an adjustment to the plume signature is made based on the measurement. For example, the spray flow rate and/or fuel mixture concentration levels can be modified based on the measured parameter exceeding certain predetermined limits.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for tailoring a plume signature of a rocket exhaust, the system comprising:
   a fuel supply system; and
   a spray system that provides fuel from the fuel supply system to a rocket exhaust plume, the fuel modifying the plume signature of the rocket exhaust, the spray system having a first state that provides fuel at a first flow rate and a second state that provides fuel at a second flow rate.

2. The system of claim 1, the spray system comprising a flow valve that controls the flow rate of the fuel into the rocket exhaust plume.

3. The system of claim 2, the flow valve providing fuel at a low flow rate in the first state and a high flow rate in the second state.

4. The system of claim 2, the flow valve being a variable flow valve operative to provide fuel at a plurality of different flow rates.

5. The system of claim 1, the fuel having at least one additive to form a fuel mixture, the fuel mixture modifying the plume signature differently than the fuel.

6. The system of claim 1, further comprising a controller having a plurality of plume profiles selectable by a user, the plurality of plume profiles simulating different target vehicles by modifying the fuel provided to the rocket exhaust plume.

7. The system of claim 6, the controller modifying the flow rate of the fuel based on the selected plume profile.

8. The system of claim 6, the controller modifying a concentration level of the fuel and at least one additive based on the selected plume profile.

9. The system of claim 6, the controller comprising a custom plume profile program that allows a user to create a custom plume profile.

10. The system of claim 1, further comprising a measurement system that measures at least one parameter, the fuel provided to the rocket exhaust plume being adjustable based on the measurement of the at least one parameter.

11. A self-propelled vehicle system comprising:
   a fuel supply;
   a combustion chamber that ignites fuel provided by the fuel supply;
   a nozzle exhaust system that exhausts accelerated gases caused by the ignited fuel forming an exhaust plume; and a plume signature control system that injects portions of fuel from the fuel supply into the exhaust plume to modify the signature of the exhaust plume.

12. The system of claim 11, the plume signature control system comprising a flow valve that controls the flow rate of the fuel into the exhaust plume.

13. The system of claim 12, the plume signature control system further comprising a spray ring coupled to the flow valve, the spray ring disposed at an exit portion of the nozzle exhaust system and having a plurality of nozzles that direct fuel into the exhaust plume.

14. The system of claim 13, the plurality of nozzles comprising a first set of nozzles that provide fuel at a first flow rate and a second set of nozzles that provide fuel at a second flow rate.

15. The system of claim 11, further comprising a mixing chamber that mixes fuel with at least one additive to form a fuel mixture, the plume signature control system injects the fuel mixture into the exhaust plume to modify the signature of the exhaust plume.

16. The system of claim 11, the plume signature control system further comprising a controller having a plurality of plume profiles selectable by a user, the plurality of plume profiles simulating different target vehicles by modifying the fuel provided to the rocket exhaust plume.

17. The system of claim 16, the controller modifying one of a fuel flow rate and a concentration level of the fuel and at least one additive based on the selected plume profile.

18. The system of claim 11, further comprising a measurement system that measures at least one parameter, the fuel provided to the exhaust plume being adjustable based on the measurement of the at least one parameter.

19. A system for tailoring a plume signature of a rocket exhaust of a target missile, the system comprising:

means for providing a supply of liquid propellant;

means for spraying the liquid propellant into a rocket exhaust of a target missile to simulate an exhaust plume of an actual target missile; and means for controlling flow rate and volume of the liquid propellant into the rocket exhaust.

20. The system of claim 19, the means for controlling flow rate and volume of the liquid propellant having a low flow rate setting during flight of the target missile within the atmosphere and a high rate setting during flight of the target missile outside the atmosphere.

21. A method for controlling a plume signature of a rocket exhaust of a target vehicle, the method comprising:

selecting a plume profile from a plurality of plume profiles, the selected plume profile defining parameters associated with providing a fuel spray into a rocket exhaust of a target vehicle;

igniting a rocket motor to propel the target vehicle resulting in a rocket exhaust plume exiting the rocket exhaust; and providing the fuel spray into the rocket exhaust based on the selected plume profile, the fuel spray modifying the rocket exhaust plume to simulate an exhaust plume of an actual vehicle.

22. The method of claim 21, the selected plume profile defining a flow rate of the fuel spray at a first flow rate setting during a first portion of a flight pattern and defining a flow rate of the fuel spray at a second flow rate setting during a second portion of the flight pattern.

23. The method of claim 21, further comprising mixing at least one additive into the fuel prior to providing the fuel spray into the rocket exhaust, the at least one additive modifying the rocket exhaust plume.

24. The method of claim 23, the selected plume profile defining a concentration level of the fuel and the at least one additive during the flight pattern.

25. The method of claim 21, further comprising measuring at least one parameter and adjusting the flow rate of the fuel if it is determined that the at least one parameter exceeds a predetermined limit.

* * * * *